(12) United States Patent
Lee

(10) Patent No.: US 9,601,783 B2
(45) Date of Patent: Mar. 21, 2017

(54) ELECTROCONDUCTIVE TUNGSTEN OXIDE NANOWIRE CARRYING A PLATINUM NANODENDRITE AND METHOD FOR MANUFACTURING SAME

(71) Applicant: POSTECH ACADEMY-INDUSTRY FOUNDATION, Pohang-si (KR)

(72) Inventor: Jinwoo Lee, Seoul (KR)

(73) Assignee: POSTECH ACADEMY-INDUSTRY FOUNDATION, Gyunbuk (KR)

( * ) Notice: Subject to any disclaimer, the term of this patent is extended or adjusted under 35 U.S.C. 154(b) by 87 days.

(21) Appl. No.: 14/355,412

(22) PCT Filed: Oct. 25, 2012

(86) PCT No.: PCT/KR2012/008818
§ 371 (c)(1),
(2) Date: Apr. 30, 2014

(87) PCT Pub. No.: WO2013/065997
PCT Pub. Date: May 10, 2013

(65) Prior Publication Data
US 2014/0287346 A1    Sep. 25, 2014

(30) Foreign Application Priority Data

Nov. 2, 2011  (KR) .......................... 10-2011-0113237

(51) Int. Cl.
| | | |
|---|---|---|
| *H01M 4/90* | (2006.01) | |
| *H01M 4/88* | (2006.01) | |
| *H01M 8/1011* | (2016.01) | |
| *C01G 41/02* | (2006.01) | |
| *H01M 8/10* | (2016.01) | |
| *H01M 4/92* | (2006.01) | |
| *B82Y 30/00* | (2011.01) | |
| *B01J 23/652* | (2006.01) | |
| *B01J 35/00* | (2006.01) | |
| *B01J 35/06* | (2006.01) | |

(52) U.S. Cl.
CPC .......... *H01M 4/9016* (2013.01); *B82Y 30/00* (2013.01); *C01G 41/02* (2013.01); *H01M 4/88* (2013.01); *H01M 4/9075* (2013.01); *H01M 4/925* (2013.01); *H01M 8/1011* (2013.01); *B01J 23/6527* (2013.01); *B01J 35/0013* (2013.01); *B01J 35/0033* (2013.01); *B01J 35/06* (2013.01); *C01P 2002/72* (2013.01); *C01P 2004/04* (2013.01); *C01P 2004/16* (2013.01); *Y02E 60/523* (2013.01); *Y02P 70/56* (2015.11)

(58) Field of Classification Search
None
See application file for complete search history.

(56) References Cited

U.S. PATENT DOCUMENTS

2009/0011928 A1*  1/2009  Nwoga .................... B01J 23/42
                                                    502/152

FOREIGN PATENT DOCUMENTS

KR    10-2008-0024706       3/2008

OTHER PUBLICATIONS

Saha, Madhu Sudan et al. Tungsten oxide nanowires grown on carbon paper as Pt electrocatalyst support for high performance proton exchange membrane fuel cells. Journal of Power Sources 192. Mar. 19, 2009. pp. 330-335.*
Janarthanan Rajeswari, Balasubramanian Viswanathan, Thirukkallam Kanthadai Varadarajan, "The Tungsten trioxide nanorods as supports for platinum in methanol oxidation" National Centre for Catalysis Research, Department of Chemistry, Indian Institute of Technology Madras, Chennai 600036, India, Materials Chemistry and Physics 106 (2007) 168-174.
Cheonghee Kim, Jong-Gil Oh, Yong-Tae Kim, Hansung Kim, Hyunjoo Lee, "Platinum dendrites with controlled sizes for oxygen reduction reaction" Electrochemistry Communications 12 (2010) 1596-1599.
International Search Report dated Mar. 28, 2013, issued in International Application No. PCT/KR2012/008818.

* cited by examiner

*Primary Examiner* — Sarah A Slifka
(74) *Attorney, Agent, or Firm* — Steptoe & Johnson LLP

(57) ABSTRACT

The present invention relates to an electroconductive tungsten oxide catalyst carrying a platinum dendrite and to a method for manufacturing same, and more particularly, to a method for manufacturing an electroconductive tungsten oxide carrying a platinum nanodendrite applicable as an anode catalyst having a strong resistance to carbon monoxide poisoning in a direct methanol fuel cell. The platinum nanodendrite-electroconductive tungsten oxide nanowire catalyst according to the present invention illustrates remarkably improved resistance to carbon monoxide poisoning when compared with a common platinum nanoparticle carbon catalyst, and so, may be used as a highly efficient DMFC anode catalyst.

5 Claims, 4 Drawing Sheets

ELECTROCONDUCTIVE TUNGSTEN OXIDE NANOWIRE CARRYING A PLATINUM NANODENDRITE AND METHOD FOR MANUFACTURING SAME

CLAIM FOR PRIORITY

This application claims priority under 35 USC 371 to International Application No. PCT/KR2012/008818, filed on Oct. 25, 2012, which claims priority to Korean Patent Application No. 10-2011-0113237, filed on Nov. 2, 2011, each of which is hereby incorporated by reference in its entirety.

TECHNICAL FIELD

The present invention relates to an electroconductive tungsten oxide catalyst supported with platinum nanodendrites and a method of manufacturing the same, and, more particularly, to an electroconductive tungsten oxide catalyst supported with platinum nanodendrites, which can be used as an anode catalyst having strong resistance to carbon monoxide poisoning in a direct methanol fuel cell (DMFC).

BACKGROUND ART

In the long-term viewpoint, the development of environmentally friendly and sustainable energy sources has been attracting considerable attention world-wide. Generally-used fossil fuels emit a large amount of carbon dioxide, thus causing global warming. Global warming leads to various weather anomalies and ecosystem variations derived from sea level rise, and thus it is necessary to develop clean energy sources emitting no carbon dioxide.

A fuel cell, which is a device for producing electric energy using a chemical reaction in which fuel is oxidized at an anode and oxygen is reduced at a cathode, has actively been researched as a next-generation clean energy source. A direct methanol fuel cell, which is one of the low-temperature type fuel cells applicable for various mobile appliances, uses methanol as fuel. In the direct methanol fuel cell, a platinum catalyst is used in order to accelerate the oxidation reaction of methanol at an anode.

Currently, a catalyst in which carbon is supported with platinum-ruthenium alloy nanoparticles of 2~4 nanometers is most widely used as an anode catalyst. Methanol is adsorbed onto platinum nanoparticles in the form of carbon monoxide at the anode, oxidized into carbon dioxide, and then detached from the anode. Here, carbon monoxide causes a platinum poisoning phenomenon in which the active sites of platinum nanoparticles are blocked by carbon monoxide to reduce the activity thereof because the bonding force of carbon monoxide to platinum is very strong. Ruthenium serves to remarkably reduce the platinum poisoning phenomenon because it functions to rapidly oxidize carbon monoxide adsorbed on platinum into carbon dioxide. However, such an anode catalyst is problematic in that its catalytic activity is deteriorated with the passage of time because carbon, used as a carrier, is corroded under a DFMC operation environment to cause the agglomeration and elution of nanoparticles.

In order to solve the above problems of an anode catalyst, methods of preventing the poisoning of a platinum catalyst by accelerating the oxidation of adsorbed carbon monoxide while using a metal oxide having excellent durability as a carrier have been proposed. In particular, tungsten oxide, such as $WO_3$, has been attracting considerable attention as a carrier capable of replacing carbon because it has strong resistance to carbon monoxide poisoning by accelerating the oxidation of carbon monoxide adsorbed with an OH group and has high durability under a DFMC operation environment. However, such carriers are problematic in that they are not suitable for use in DMFCs because they have a small surface area and do not have electrical conductivity. For this reason, it is still required to develop a novel catalyst having strong resistance to carbon monoxide poisoning, having high durability under a DFMC operation environment and having a large surface area to exhibit excellent activity.

DISCLOSURE

Technical Problem

An object of the present invention is to develop a novel catalyst for a fuel cell having strong resistance to carbon monoxide poisoning.

Another object of the present invention is to provide a novel catalyst for DFMC having strong resistance to carbon monoxide poisoning, high durability and excellent electrical conductivity, and a method of manufacturing the same.

Still another object of the present invention is to develop a novel electrode for DFMC having strong resistance to carbon monoxide poisoning and high durability, and a fuel cell using the same.

Technical Solution

An aspect of the present invention provides a catalyst particle, which is characterized in that an electroconductive tungsten oxide nanowire is supported with methanol oxidation active particles. The methanol oxidation active particle is an active material particle capable of oxidizing methanol at the anode of a fuel cell. The tungsten oxide has electroconductivity such that it can be used in an electrode of a fuel cell. The catalyst particle has resistance to carbon monoxide poisoning.

In the present invention, the methanol oxidation active particle is a platinum nanoparticle, and may further include other active materials commonly known as methanol oxidation catalysts. The platinum nanoparticle may be synthesized in the form of a dendrite such that the usage of platinum is reduced, and simultaneously the property (mass activity) of platinum can be improved, thus allowing the platinum nanoparticle to have high activity for a methanol oxidation reaction. Although not theoretically limited, a platinum nanodendrite is effective in increasing the activity for a methanol oxidation reaction because it has a large surface area and its platinum particles are uniformly connected with each other. The platinum nanodendrite has a particle size of 1~100 nm. Research into the activity of platinum nanodendrite particles for a methanol oxidation reaction and the preparation method thereof are commonly known in the related reference document (Wang et al., *J. Cryst. Growth* 2010, 10, 3454).

Another aspect of the present invention provides method of preparing a tungsten oxide nanowire supported with a platinum dendrite, including the steps of: crystallizing a tungsten oxide nanowire; and implanting a platinum precursor into the crystallized tungsten oxide nanowire. Here, $WCl_6$ or tungsten isopropoxide may be used as a tungsten precursor.

Still another aspect of the present invention provides a direct methanol fuel cell, including: a cathode provided with an electroconductive tungsten oxide supported with a platinum-containing nanoparticle.

Still another aspect of the present invention provides a method of oxidizing methanol using an electroconductive nanowire supported with a platinum nanodendrite particle.

Still another aspect of the present invention provides an electroconductive tungsten oxide nanowire supported with a platinum nanodendrite particle, and a use thereof.

In the present invention, as the tungsten oxide, $WO_2$ or $W_{18}O_{49}$, having electroconductivity, may be used. Preferably, the tungsten oxide may be $W_{18}O_{49}$ shown in the XRD (Panalytical X'Pert PRO) graph of FIG. 1. In the present invention, the tungsten oxide nanowire may have a diameter of 1~10 nm, preferably 1~5 nm, and more preferably 2 nm. The synthesis method of the tungsten oxide nanowire may refer to the commonly known method (J. Polleux et al., *J. Am. Chem. Soc.* 2005, 127, 15595). Preferably, the tungsten oxide nanowire may be prepared by dissolving $WCl_6$ in benzyl alcohol and then heating the solution.

In the present invention, the platinum nanodendrite may be prepared by injecting a solution, in which $H_2PtCl_6.6H_2O$ is dissolved in ethylene glycol, into a solution, in which tungsten nanowires are crystallized, at a temperature of 160~196° C. The platinum nanodendrite is not formed at a temperature of below 160° C., and a temperature of above 196° C. is higher than the boiling point of ethylene glycol.

The platinum nanodendrite-electroconductive tungsten oxide nanowire catalyst of the present invention can be used as an anode catalyst for a high-efficiency DMFC because it has remarkably improved resistance to carbon monoxide poisoning compared to a general platinum nanoparticle-carbon catalyst.

Advantageous Effects

The catalyst for DFMC according to the present invention has strong resistance to carbon monoxide poisoning, high durability and excellent electrical conductivity. Therefore, this catalyst can be used to develop a high-performance fuel cell having good long-term stability.

MODE FOR INVENTION

Hereinafter, the present invention will be described in more detail with reference to the following Examples. However, these Examples are set forth to illustrate the present invention, and the scope of the present invention is not limited thereto.

Example 1

Figure 1:
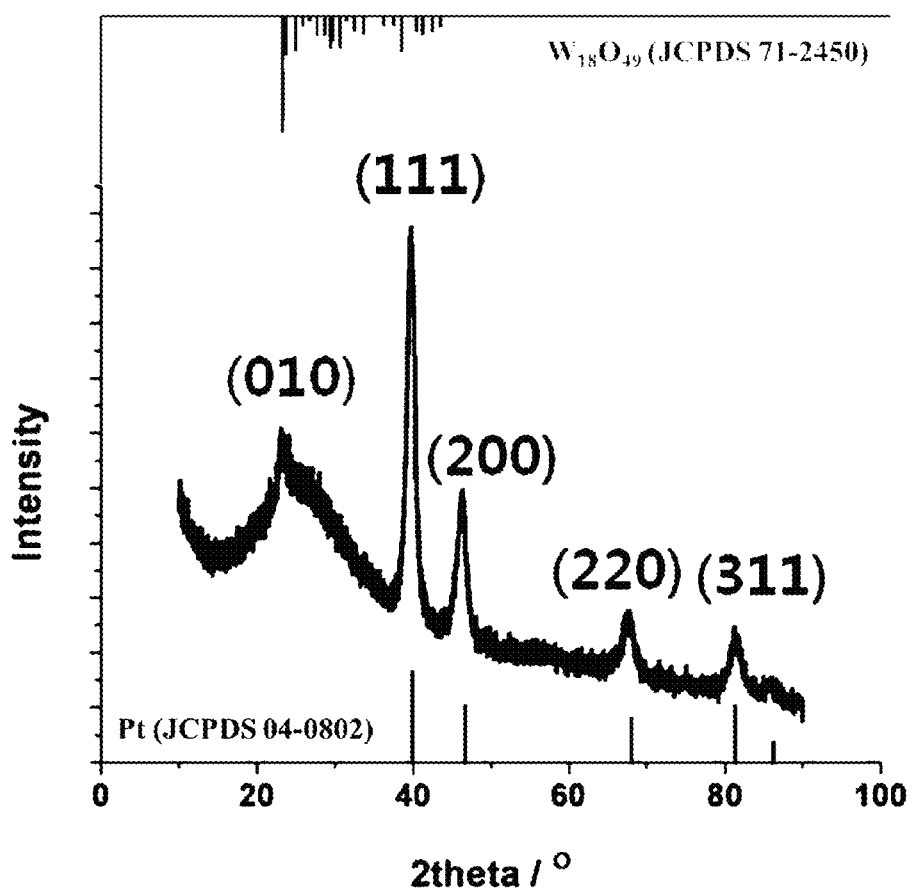
FIG. 1 is an XRD graph of electroconductive tungsten oxide nanowires supported with platinum nanodendrites according to an embodiment of the present invention.
Figure 2:
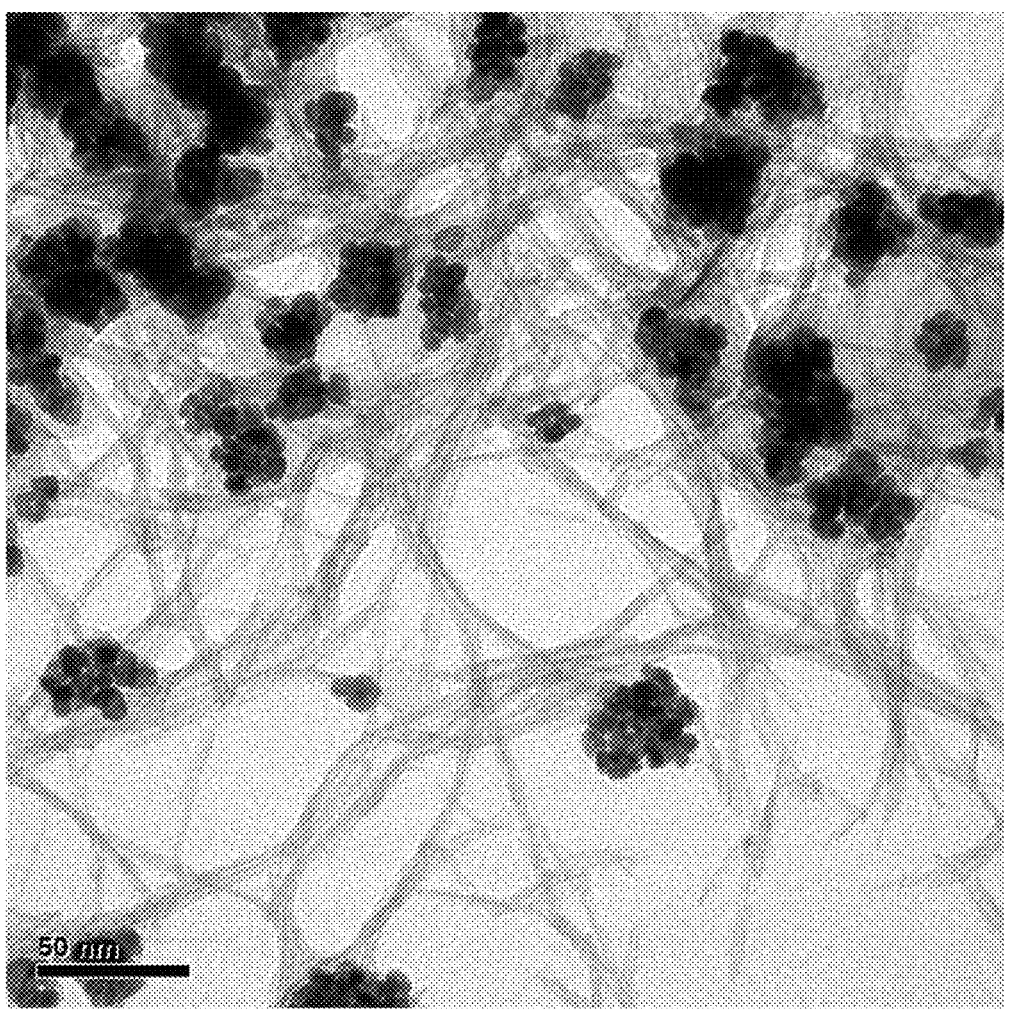
FIG. 2 is a TEM photograph of electroconductive tungsten oxide nanowires supported with platinum nanodendrites according to an embodiment of the present invention.

Preparation of Electroconductive Tungsten Oxide Nanowire Supported with Platinum Nanodendrite A first solution in which 200 mg of $WCl_6$ was dissolved in 10 mL of benzyl alcohol was heated to 196° C., and a second solution in which 50 mg of $H_2PtCl_6.6H_2O$ was dissolved in 10 mL of ethylene glycol was injected into the first solution in an amount of 2 mL per 5 min to prepare electroconductive tungsten oxide nanowires supported with platinum nanodendrites, that is, platinum nanodendrite-tungsten oxide composite nanowires. As shown in FIG. 1, the tungsten oxide in the prepared platinum nanodendrite-tungsten oxide composite nanowire has a phase of $W_{18}O_{49}$. It can be ascertained from FIG. 2 that platinum dendrites having an average particle size of 30 nm are uniformly dispersed and supported in the 2 nm wide $W_{18}O_{49}$ nanowire bundle.

In this Example 1, even when tungsten isopropoxide is used as a tungsten oxide precursor instead of $WCl_6$, electroconductive tungsten oxide nanowires the same as or similar to the prepared electroconductive tungsten oxide nanowires can be obtained.

Example 2

Test for Activity of Methanol Oxidation Catalyst

Figure 3:
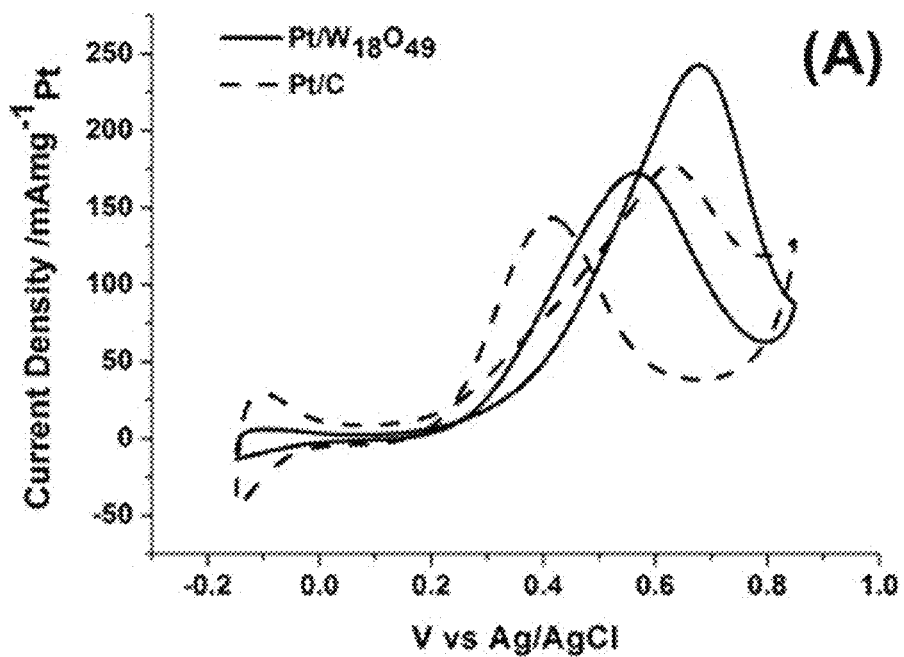
FIG. 3(A) is a graph showing the methanol oxidation reaction of electroconductive tungsten oxide nanowires supported with platinum nanodendrites according to an embodiment of the present invention.
FIG. 3(B) is a graph showing the carbon monoxide stripping of electroconductive tungsten oxide nanowires supported with platinum nanodendrites according to an embodiment of the present invention.
Figure 3:
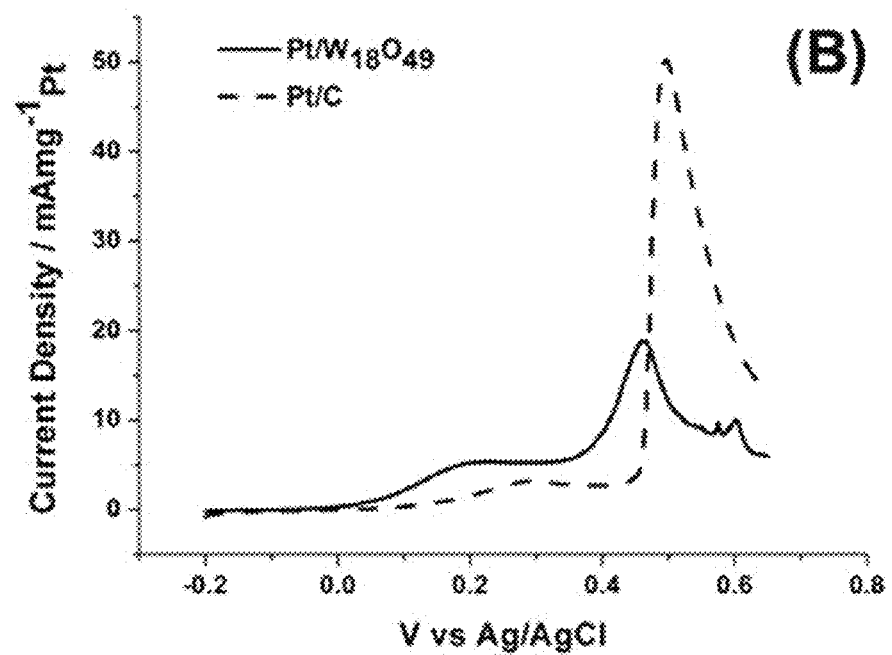

In order to evaluate the activity of a methanol oxidation catalyst using the nanowires prepared in Example 1, a cyclic voltammetry test was carried out using a half cell having three electrodes. For this test, 5 mg of a catalyst was mixed with 0.98 mL of distilled water and 2 μL of 5 wt % Nafion solution, and then ultrasonically dispersed for 10 min. Then, this solution was dropped onto a glassy carbon electrode and dried. An aqueous solution of 1 M methanol+0.1 M perchloric cid was used as working solution. Prior to an electrode experiment, nitrogen was supplied for 20 min to remove oxygen. FIG. 3(A) is a graph showing the results of a cyclic voltammetry test of the catalyst prepared in Example 1 and a commercially available catalyst 10 wt % Pt/C (E-Tek Corporation). From FIG. 3(A), it can be ascertained that the catalyst prepared in Example 1 has excellent catalytic activity 1.4 times that of the commercially available catalyst, comparing the current density ($mA/mg_{Pt}$) of the catalyst prepared in Example 1 per unit weight of platinum at the peak potential with that of the commercially available catalyst.

The carbon monoxide stripping test was carried out in an aqueous 0.1 M perchloric acid solution. Prior to the test, argon was supplied for 30 min to remove oxygen. High-purity carbon monoxide was supplied for 30 min at a voltage of −0.12 V to adsorb carbon monoxide on a catalyst. Carbon monoxide dissolved in a solvent without being adsorbed on the catalyst was removed by supplying argon for 30 min. FIG. 3(B) is a carbon monoxide stripping graph of the catalyst prepared in Example 1 and the commercially available catalyst. As shown in FIG. 3(B), it can be ascertained that the current density of the catalyst prepared in Example 1 is still lower than that of the commercially available catalyst. That is, it means that the catalyst prepared in Example 1 has very excellent resistance to carbon monoxide poisoning compared to the commercially available catalyst.

Figure 4:
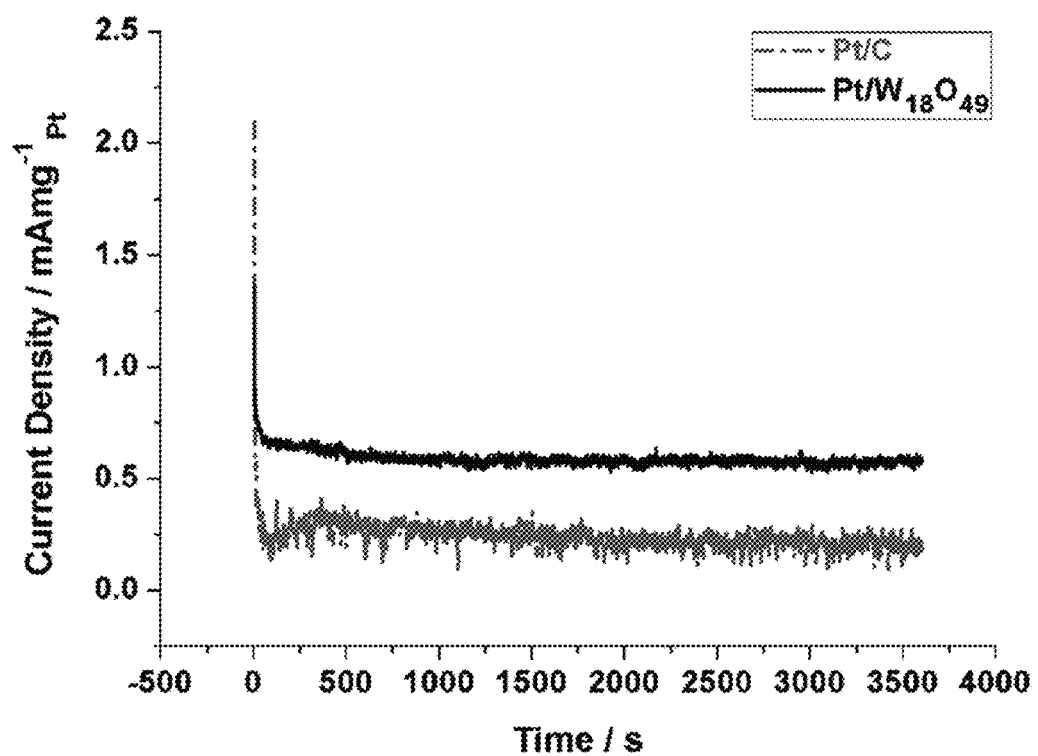
FIG. 4 is a time-current graph of electroconductive tungsten oxide nanowires supported with platinum nanodendrites according to an embodiment of the present invention.

The catalyst durability test was carried out by comparing the time-current graphs recorded during applying a potential of 0.2 V for 1 hr. In this test, an aqueous 0.1 M perchloric acid solution was used as working solution. FIG. 4 is a time-current graph of the catalyst prepared in Example 1 and the commercially available catalyst. From FIG. 4, it can be ascertained that the catalyst prepared in Example 1 exhibits higher durability than commercially available catalyst.

From the above results, it can be ascertained that high catalytic activity is caused by the synergetic effect of the large surface area and interconnected structure of platinum nanodendrites and the acceleration of oxidation of carbon monoxide by tungsten oxide, and high durability is caused by high resistance to carbon monoxide poisoning.

The invention claimed is:

1. A catalyst, comprising electroconductive tungsten oxide nanowires supported with methanol oxidation active particles,
    wherein the tungsten oxide nanowires are a bundle of nanowires having a thickness of 1~5 nm, and the methanol oxidation active particles include platinum nanodendrite particles having a size of 1-100 nm.

2. The catalyst of claim 1, wherein the tungsten oxide is $WO_2$ or $W_{18}O_{49}$.

3. The catalyst of claim 1, wherein the methanol oxidation active particle includes a platinum nanoparticle.

4. The catalyst of claim 1, wherein the methanol oxidation active particles are all platinum nanodendrite particles.

5. The catalyst of claim 4, wherein the platinum nanodendrite particles have a size of 1~100 nm.

\* \* \* \* \*